US011222228B2

(12) United States Patent
Wang et al.

(10) Patent No.: US 11,222,228 B2
(45) Date of Patent: *Jan. 11, 2022

(54) TECHNIQUES FOR EXAMPLE-BASED AFFINE REGISTRATION

(71) Applicant: INTERNATIONAL BUSINESS MACHINES CORPORATION, Armonk, NY (US)

(72) Inventors: Hongzhi Wang, San Jose, CA (US); Alexandros Karargyris, San Jose, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 48 days.

This patent is subject to a terminal disclaimer.

(21) Appl. No.: 16/808,876

(22) Filed: Mar. 4, 2020

(65) Prior Publication Data
US 2020/0210757 A1    Jul. 2, 2020

Related U.S. Application Data

(63) Continuation of application No. 15/966,993, filed on Apr. 30, 2018, now Pat. No. 10,607,108.

(51) Int. Cl.
*G06K 9/62* (2006.01)
*G06T 3/00* (2006.01)
*G06K 9/46* (2006.01)

(52) U.S. Cl.
CPC .......... *G06K 9/6211* (2013.01); *G06K 9/4671* (2013.01); *G06K 9/6256* (2013.01); *G06T 3/0075* (2013.01)

(58) Field of Classification Search
CPC . G06T 2207/20084; G06T 2207/20081; G06T 2207/30088; G06K 9/6232; G06K 9/00147
See application file for complete search history.

(56) References Cited

U.S. PATENT DOCUMENTS 6,421,458 B2    7/2002   Michael et al.
8,041,080 B2 *  10/2011  Porikli ............... G06K 9/00818
                                                            382/104
(Continued)

OTHER PUBLICATIONS

"Content-similarity guided decision support in healthcare," Nov. 6, 2008.

(Continued)

*Primary Examiner* — Yosef Kassa
(74) *Attorney, Agent, or Firm* — Erik Huestis; Stephen Kenny; Foley Hoag, LLP

(57) ABSTRACT

Example-based affine registration is provided. In various embodiments, a plurality of training images is read. A predetermined affine transform is read for each of the plurality of training images. Each affine transform maps its associated image to a template. Weights are determined for each of the plurality of training images. The weights are determined to minimize a difference between the test image and a weighted linear combination of the training images. An affine transform is determined mapping the test image to the template by computing a weighted linear combination of the affine transforms using the weights.

20 Claims, 13 Drawing Sheets

(56) References Cited

U.S. PATENT DOCUMENTS

| | | |
|---|---|---|
| 8,285,013 B2 | 10/2012 | Moriya |
| 8,323,188 B2 * | 12/2012 | Tran ........................ A61B 5/002 |
| | | 600/300 |
| 8,500,636 B2 * | 8/2013 | Tran ..................... A61B 5/0006 |
| | | 600/300 |
| 8,515,136 B2 | 8/2013 | Mori et al. |
| 8,515,180 B2 | 8/2013 | Kato et al. |
| 8,515,256 B2 | 8/2013 | Fukumoto et al. |
| 8,594,271 B2 | 11/2013 | Sakaguchi et al. |
| 8,643,739 B2 | 2/2014 | Sagawa |
| 8,684,900 B2 * | 4/2014 | Tran ........................ A61B 5/002 |
| | | 600/3 |
| 8,684,922 B2 * | 4/2014 | Tran ..................... A61B 5/6887 |
| | | 600/300 |
| 8,831,311 B2 * | 9/2014 | Swamy .................. G16H 50/30 |
| | | 382/128 |
| 9,031,332 B2 * | 5/2015 | Thoreau ............... H04N 19/176 |
| | | 382/232 |
| 9,036,888 B2 * | 5/2015 | Kamath ............... G06K 9/6253 |
| | | 382/133 |
| 9,349,076 B1 | 5/2016 | Liu et al. |
| 9,510,756 B2 | 12/2016 | Grady et al. |
| 9,576,221 B2 | 2/2017 | Mayle et al. |
| 9,633,250 B2 * | 4/2017 | Tuzel .................... G06T 3/4053 |

OTHER PUBLICATIONS

*"Machine Learning Algorithms for Smart Meter Diagnostics," Jul. 16, 2015.*
Van den Eynden, V. et al., "Managing and Sharing Data-UK Data Archive," 2011.
Yang, J. et al., "Method and Apparatus for Evaluating the Quality of Medical Imaging Systems and Components Using Model Observers and Computer Aided Detection Algorithms," Nov. 1, 2005.

\* cited by examiner

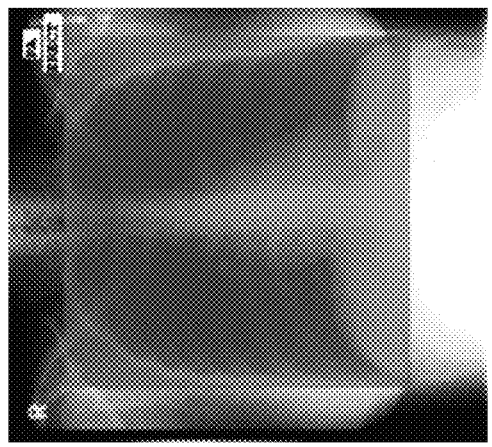
FIG. 2C
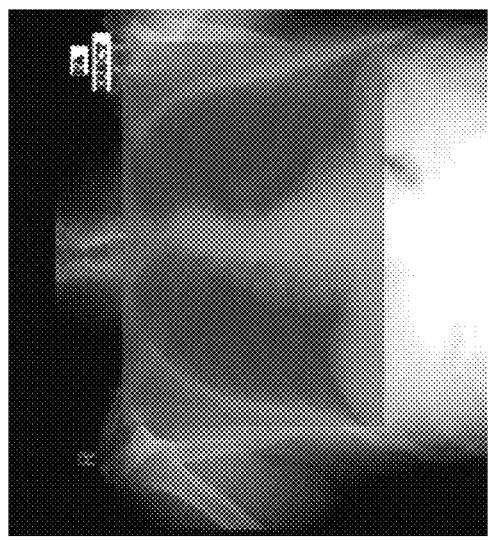
FIG. 2B
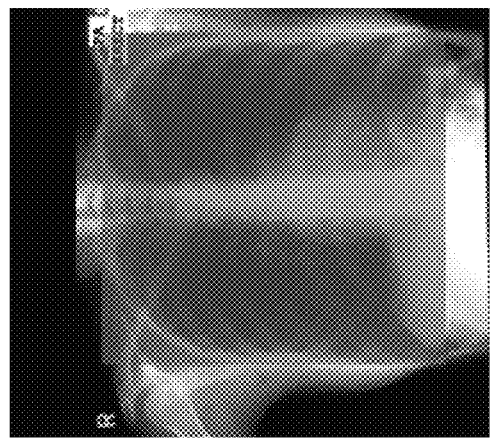
FIG. 2A
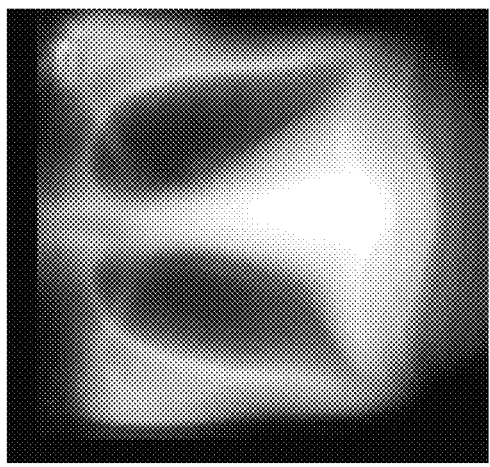
FIG. 2E
FIG. 2D

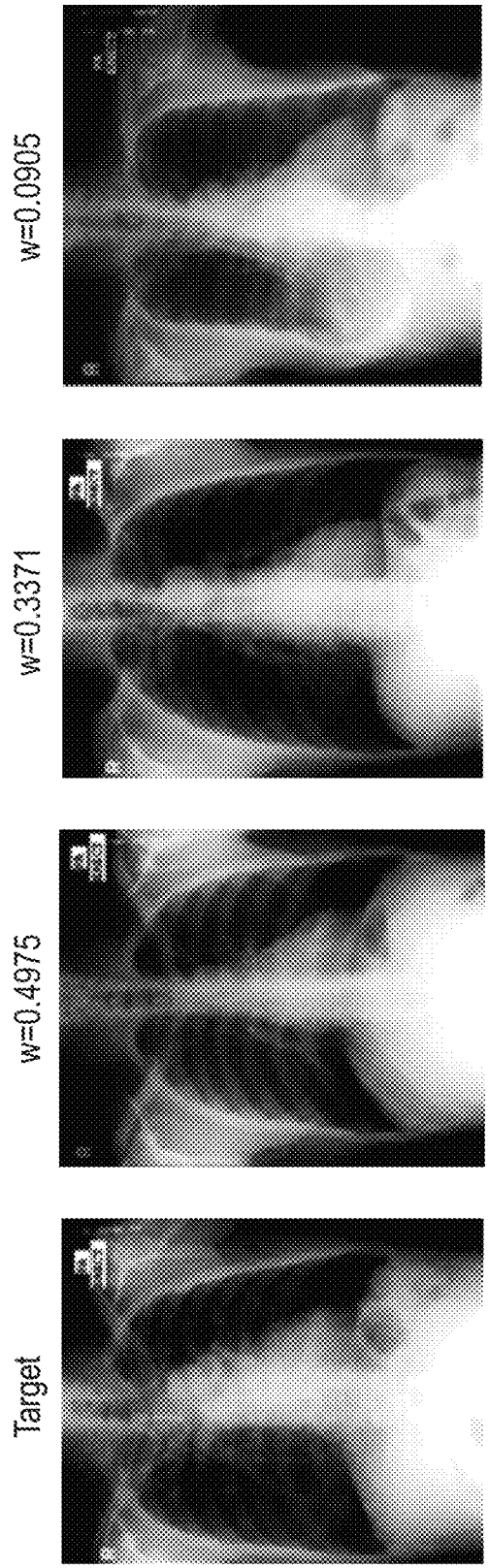
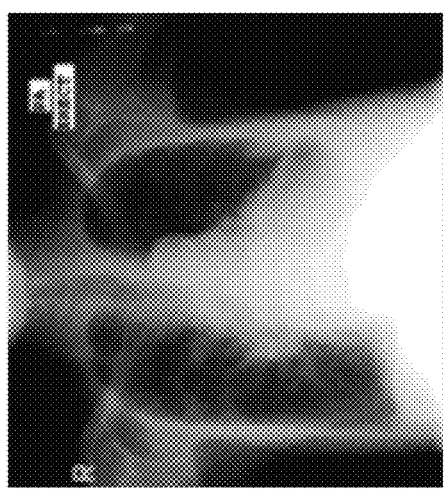
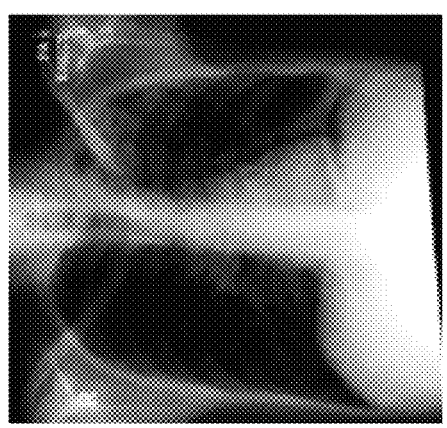
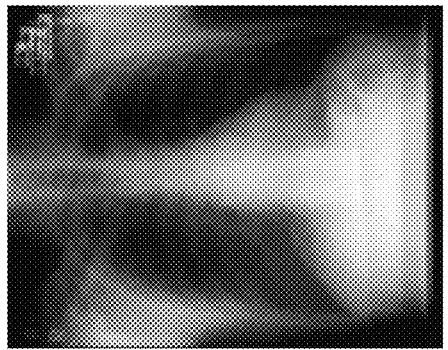
FIG. 3A Target
FIG. 3B w=0.4975
FIG. 3C w=0.3371
FIG. 3D w=0.0905
FIG. 3E Reconstructed
FIG. 3F w=0.0658
FIG. 3G w=0.0092

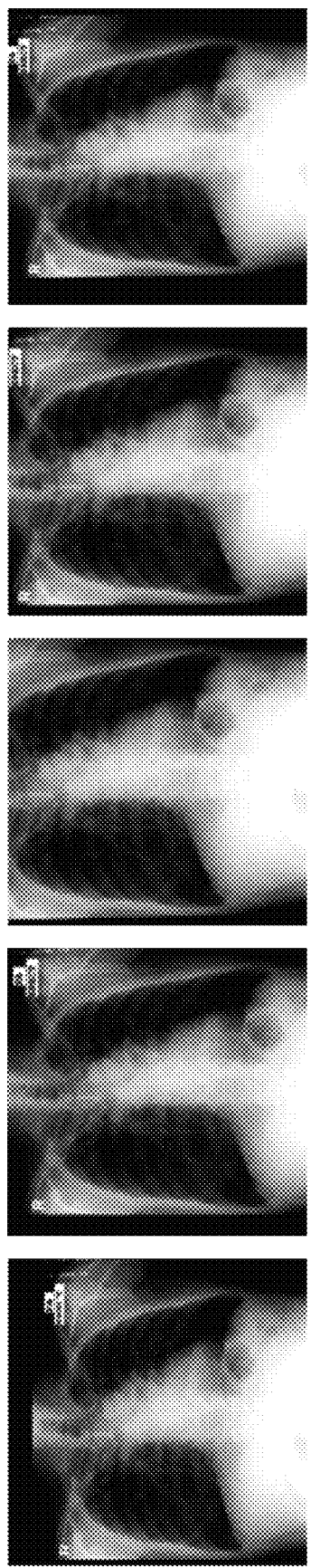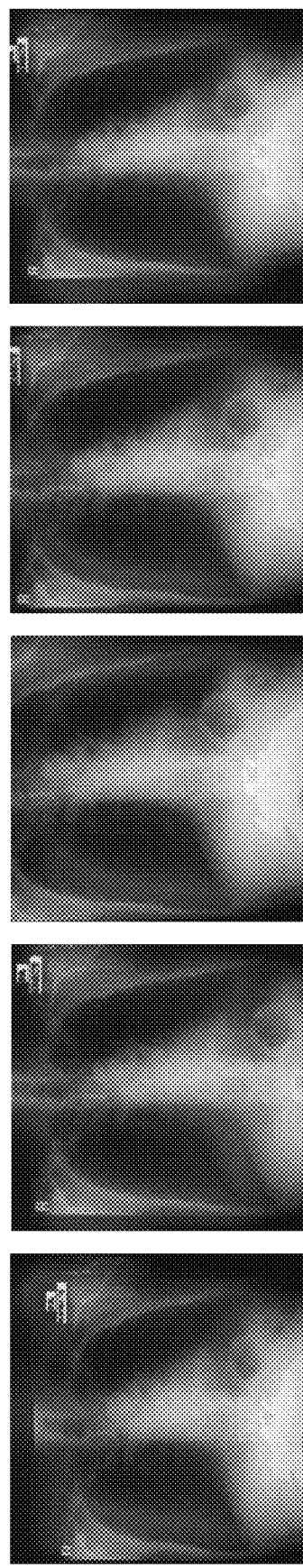

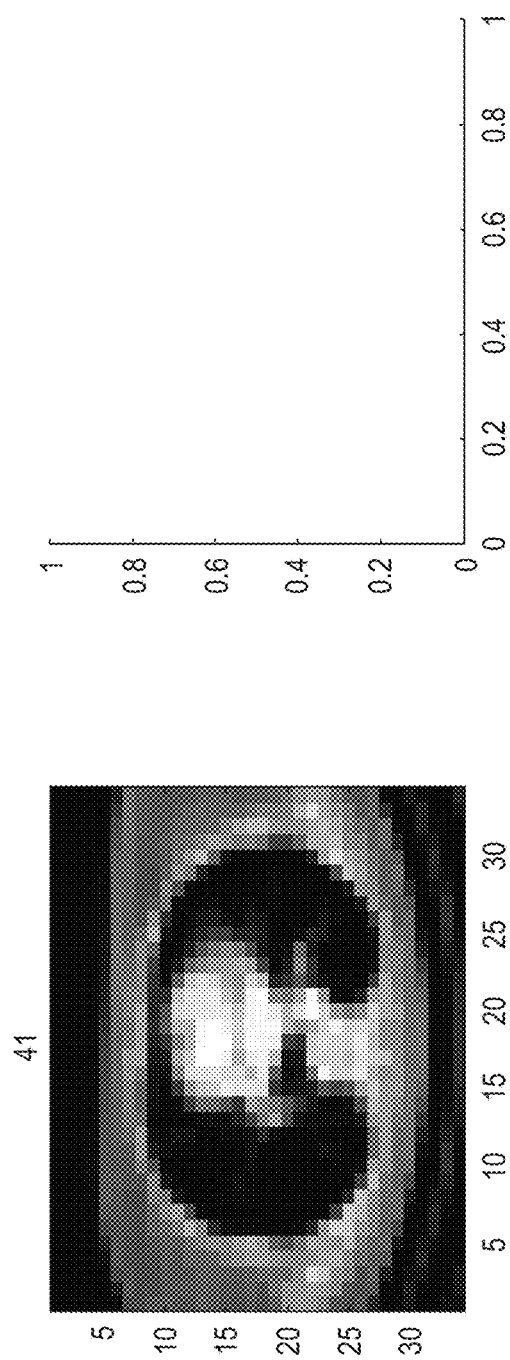
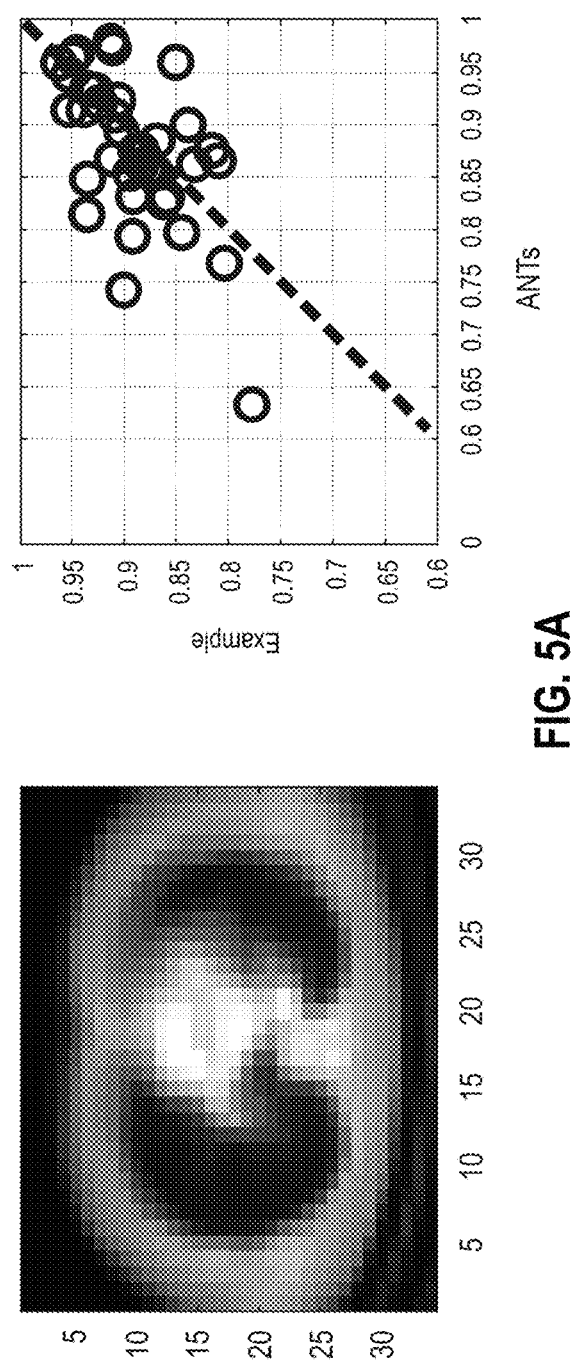
FIG. 5A

TECHNIQUES FOR EXAMPLE-BASED AFFINE REGISTRATION

CROSS-REFERENCE TO RELATED APPLICATIONS

This application is a continuation of U.S. application Ser. No. 15/966,993, filed Apr. 30, 2018, which is hereby incorporated by reference in its entirety.

BACKGROUND

Embodiments of the present disclosure relate to affine registration, and more specifically, to example-based affine registration that is useful in medical imagery processing.

BRIEF SUMMARY

According to embodiments of the present disclosure, methods of and computer program products for affine registration are provided. In various embodiments, a plurality of training images is read. A predetermined affine transform is read for each of the plurality of training images. Each affine transform maps its associated image to a template. Weights are determined for each of the plurality of training images. The weights are determined to minimize a difference between the test image and a weighted linear combination of the training images. An affine transform is determined mapping the test image to the template by computing a weighted linear combination of the affine transforms using the weights.

BRIEF DESCRIPTION OF THE SEVERAL VIEWS OF THE DRAWINGS

FIGS. 2A-E are exemplary training images including lung bounding boxes.

FIGS. 3A-G illustrates an example of example-based affine registration according to embodiments of the present disclosure.

FIGS. 4A-J are exemplary results of warping a target image according to embodiments of the present disclosure.

FIGS. 5A-B are a plot of performance of lung bounding box alignment.

DETAILED DESCRIPTION

Figure 1:
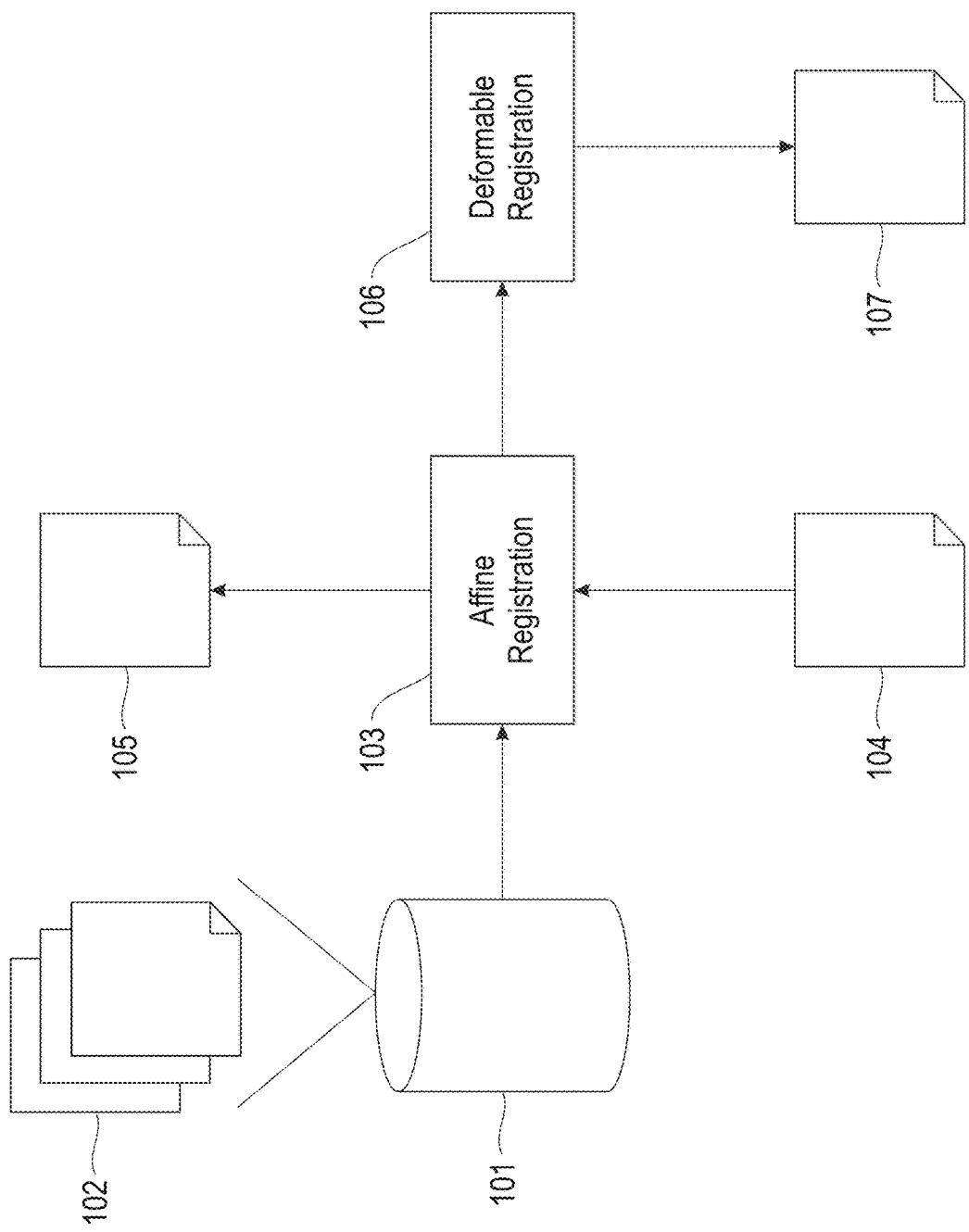
FIG. 1 illustrates a system for example-based affine registration according to embodiments of the present disclosure.

Medical image registration aims to find dense correspondence between images that can align anatomical structures across imaging modalities, across imaging time points, and across subjects. It is applicable for anatomy segmentation, longitudinal study, morphometry study, and various other analyses.

Depending on the underlying transformation model, registration can be categorized as affine registration or deformable registration. Affine registration assumes an affine transformation, which includes translation, rotation, and scale differences between registered images. Deformable registration allows more flexible non-linear deformations. Affine registration may be easier and faster to compute than deformable registration. It may be applied as initialization for deformable registration. Hence, improving the robustness and accuracy of affine registration benefits deformable registration as well.

Affine registration methods are generally based on optimization. With a pre-defined objective cost function that captures how well two images are aligned based on features extracted from images, optimization is applied to search for optimal affine parameters that minimize the objective function. One limitation of the optimization-based approach is that its performance is sensitive to initialization and can be trapped to local optimal solutions. As a result, it is not registering similar images to the same target image using the same registration method may produce very different results.

To address this and other shortcomings of alternative methods, the present disclosure provides an example-based approach for affine registration. Various embodiments leverage the insight that affine transformations produced for similar images should be similar. Accordingly, in various embodiments, the affine transformation for warping a testing image to a template is produced by linear combination of affine transformations produced for training images that are similar to the testing image. One advantage of this approach is that it is more robust than classical optimization-based affine registration techniques. The estimated affine transformation can be further refined by using it as initialization to an optimization-based affine registration method.

In this context, images with known affine transformations that transfer them to a template provide examples for solving the affine registration problem. Registering a new image to the same template is a much simpler problem if the registration problem has been solved for similar images. At the least, affine registration for the new image does not have to start over from scratch again. Instead, the affine transformations produced for similar images give close approximations for the new image, which can be used to initialize an optimization-based method to reduce the risk of converging to local optimum solutions.

In various embodiments, a set of training images is employed for which accurate affine transformations have been calculated using existing affine registration tools. Given a testing image, its affine transformation is obtained by linearly combining affine transformations produced for the training images. As set out below, these methods have been successfully applied to chest X-ray images for lung detection and heart segmentation.

One advantage of example-based inference is that generalization is achieved through reliable interpolation. Multi-atlas segmentation is an application of example-based inference for anatomy segmentation. In multi-atlas segmentation, each atlas is an example solving the corresponding segmentation problem. Interpolation-based inference is achieved through deformable registration that brings each atlas to the close neighbor of a new image.

Multi-atlas segmentation may be adapted for deformable registration. Unlike such approaches, the present disclosure provides affine registration instead of deformable registration. Example-based inference is more suitable for affine registration than for deformable registration for the following reasons. First, linear combination of affine transformations is still a valid affine transformation, however diffeomorphic transformations cannot be integrated through linearly combining diffeomorphic transformations. Time consuming optimization has to be applied to ensure the resulting transformation is diffeomorphic. Second, deformable transformations usually are spatial varying. To accurately estimate deformable transformation using example-based inference, it is necessary to calculate deformable registration between each training image and the testing image to make sure they are locally similar across the entire image. The high computational cost makes it impractical for estimating deformable transformations for individual images. In contrast, affine transformation is a global transformation. Affine estimation using example-based inference needs training images to be similar to a testing image at the global image level, which only requires rigid alignment between training and testing images. Since medical images are acquired under constrained conditions, rigid alignment is often unnecessary either.

Alternative approaches include learning-based transformation estimation methods such as convolutional neural networks (CNN). A common limitation of learning-based methods is that they usually need more training data than example-based inference to ensure good generalization.

Referring to FIG. 1, an exemplary system for example-based affine registration is illustrated according to embodiments of the present disclosure. A datastore 101 includes a plurality of training images 102, accessible to affine registration 103. As set out below, affine registration 103 is applied to image 104 to generate the result 105 of the affine registration. In some embodiments, the output of affine registration 103 is provided to another registration process, such as deformable registration 106 as an initial estimate. In such embodiments, a final registration 107 is then generated.

Let $J=\{I_1, \ldots, I_n\}$ be a training set containing n images. Let I be a template. Let $T_{i \to I}$ be an affine transformation that aligns $I_i$ to template I. Let F be another image and $T_{F \to I}$ be the affine transformation that aligns F to I. For 2D and 3D images, an affine transformation is a matrix containing 6 and 12 parameters, respectively. A linear model is applied to estimate $T_{F \to I}$ from affine transformations of the training images as follows.

$$\hat{T}_{F \to I} = \sum_{i=1}^{n} w_i T_{i \to I}, w_i \geq 0, \sum_{i=1}^{n} w_i = 1 \qquad \text{Equation 1}$$

In Equation 1, $w_i$ indicates how well $T_{F \to I}$ can be represented by $T_{i \to I}$. The objective of optimization is to minimize the difference between $\hat{T}_{F \to I}$ and $T_{F \to I}$, which is equivalent to minimizing the following objective function.

$$E_w = \sum_x \left[ F \circ T_{F \to I}(x) - F \circ \hat{T}_{F \to I}(x) \right]^2 \qquad \text{Equation 2}$$

In Equation 2, $w=[w_1; \ldots; w_n]$ and x indexes through image space. F∘T is the image obtained by warping F using transformation T. To simplify the problem, the following approximation may be made $F \circ \hat{T}_{F \to I}(x) \approx \Sigma_i w_i F \circ T_{i \to I}(x)$. To avoid large approximation errors, $T_{i \to I}$ needs to be close to $\hat{T}_{F \to I}$ for every $w_i>0$, which can be satisfied if each $I_i$ with $w_i>0$ is similar to F. Using this approximation, $E_w$ may be given as follows:

$$E_w \approx \sum_x \left[ \sum_i w_i (F \circ T_{F \to I}(x) - F \circ T_{i \to I}(x)) \right]^2 \qquad \text{Equation 3}$$

$$\approx \sum_x \left[ \sum_i w_i (I_i \circ T_{i \to I}(x) - F \circ T_{i \to I}(x)) \right]^2$$

$$= \sum_x \left[ \sum_i w_i (I_i(x) - F(x)) \right]^2$$

$$= w^t M w$$

In Equation 3 M is a matrix with:

$$M(i,j) = \sum_x (F(x) - I_i(x))(F(x) - I_j(x)) \qquad \text{Equation 4}$$

The approximation in Equation 3 is derived from the fact that images are similar to each other after properly warped to the template, $F \circ T_{F \to I} \approx I_i \circ T_{i \to I}$ for any i. The weights that minimize the above objective function is:

$$w^* = \text{argmin}_w w^t M w, \text{ subject to } w_i \geq 0, \sum_{i=1}^{n} w_i = 1 \qquad \text{Equation 5}$$

In Equation 5, $\Sigma_{i=1}^{n} w_i I_i$ can be interpreted as a linear construction of F using the training images. The weights solved from Equation 5 minimize the reconstruction error. Hence, the final formulation assumes a simple linear correlation between affine transformations and images.

Without the nonnegative constraint on the weights, Equation 5 can be solved by w=

$$\frac{M^{-1} 1_n}{1_n^t M^{-1} 1_n}.$$

To solve under the non-negative constraint, an iterative process may be applied. At each iteration, if $$w = \frac{M^{-1} 1_n}{1_n^t M^{-1} 1_n}$$

has negative weights, the training images with negative weights are removed. Accordingly, M is updated and weights are recalculated for the remaining training images. This process repeats until remained training images all have positive weights.

One assumption behind the above formulation is that for each testing image, similar images with known affine transformations can be found in the training set. This requirement can be reached by including sufficient training images that are uniformly sampled from the target population. Given the fact that medical images are often acquired under constrained imaging conditions, a medium size training set is usually sufficient. In the exemplary data below, it is illustrated that that this goal can be achieved with a training set containing fewer than 50 images for 2D chest X-ray images.

To make the approximation better conditioned, image similarity between each training image and a testing image can be improved by calculating affine transformation $T_{i \to F}$ to warp each training image to F. This approach can improve estimation accuracy.

Using similar training images may produce good approximated affine transformations for a testing image, but the solution may still not perfectly fit the testing image, especially when only limited training images are available. To obtain a more accurate solution, the approximation produced by the above example-based estimation can be refined by applying it as initialization to an optimization-based approach. Example-based affine estimation can produce a good initialization that improves the chance of converging to global optimal solutions using an optimization-based approach.

Referring to FIGS. 2A-D, exemplary training images and their lung bounding boxes are provided. FIG. 2E is an exemplary template built from 97 training images.

In this example, two publicly available datasets are used. One dataset contains 138 frontal chest X-ray images from Montgomery County Tuberculosis screening program, of which 80 are normal cases and 58 are cases with manifestations of Tuberculosis (TB). For these images, a minimum rectangle bounding box covering the lung region was manually marked for each image. Examples are shown in FIG. 2. Large variations in shape and scale of the lung are observed across subjects. Manual segmentation of the heart was produced for 41 images by a clinician. In this example, the 97 images without heart segmentation were applied as training images for the registration methods herein, and the 41 images with heart segmentation were applied as testing images.

The second chest X-ray dataset is from the Indiana Network for Patient Care, which contains over 3000 frontal chest X-ray images. There are no ground truth annotations for this dataset. This dataset was only used for training the spatial transformer networks in these examples.

Five methods were tested for registering each testing image to the template: 1) spatial transformer networks (SpatialTran); 2) FLIRT affine registration (FLIRT); 3) ANTs affine registration (ANTs); 4) example-based estimation (Example); and 5) example-based estimation refined by ANTs affine registration (E-Refined).

Two experiments were conducted, using the manually labeled lung bounding box and the heart segmentation, respectively. In the first experiment, the lung bounding box was warped from the template to each of the testing images. The warped bounding boxes are compared with manually labeled bounding boxes using DSC. In the second experiments, pairwise affine transformations are produced between each pair of testing images by composing their respective affine transformations to the template. Based on the pairwise affine transformations, each testing image and its heart segmentation is warped to the remaining testing images. A leave-one-out cross-validation was then conducted for heart segmentation using multi-atlas label fusion. For this experiment, the joint label fusion algorithm implemented by ANTs was applied with default parameters.

Referring to FIGS. 3A-G, shows an example for example-based affine registration. For the target image, the training images with positive weights are shown along with their weights. The most similar training image receives the highest weights. The reconstructed image obtained by linearly combining the training images according to their weights shows good global similarity to the target image.

Referring to FIGS. 4A-J, exemplary results of warping the target image from FIG. 3 to the template by affine transformations produced by different methods. FIGS. 4A-E show the warped image results FIGS. 4F-J show an overlay between the template (red) and warped images (green).

Although ANTs affine registration produced good affine transformations for training images that are similar to the testing image such as those shown in FIG. 3, it produced large errors for this testing image. This result shows that small variations in the input image may lead to large variations in the result produced by optimization-based affine registration. In contrast, the example-based method works more robustly against small variations in the input image. The resulting affine transformation globally well aligns the testing image to the template. Further refining the result by ANTs optimization produced more accurate alignment for local structures.

Figure 5B:
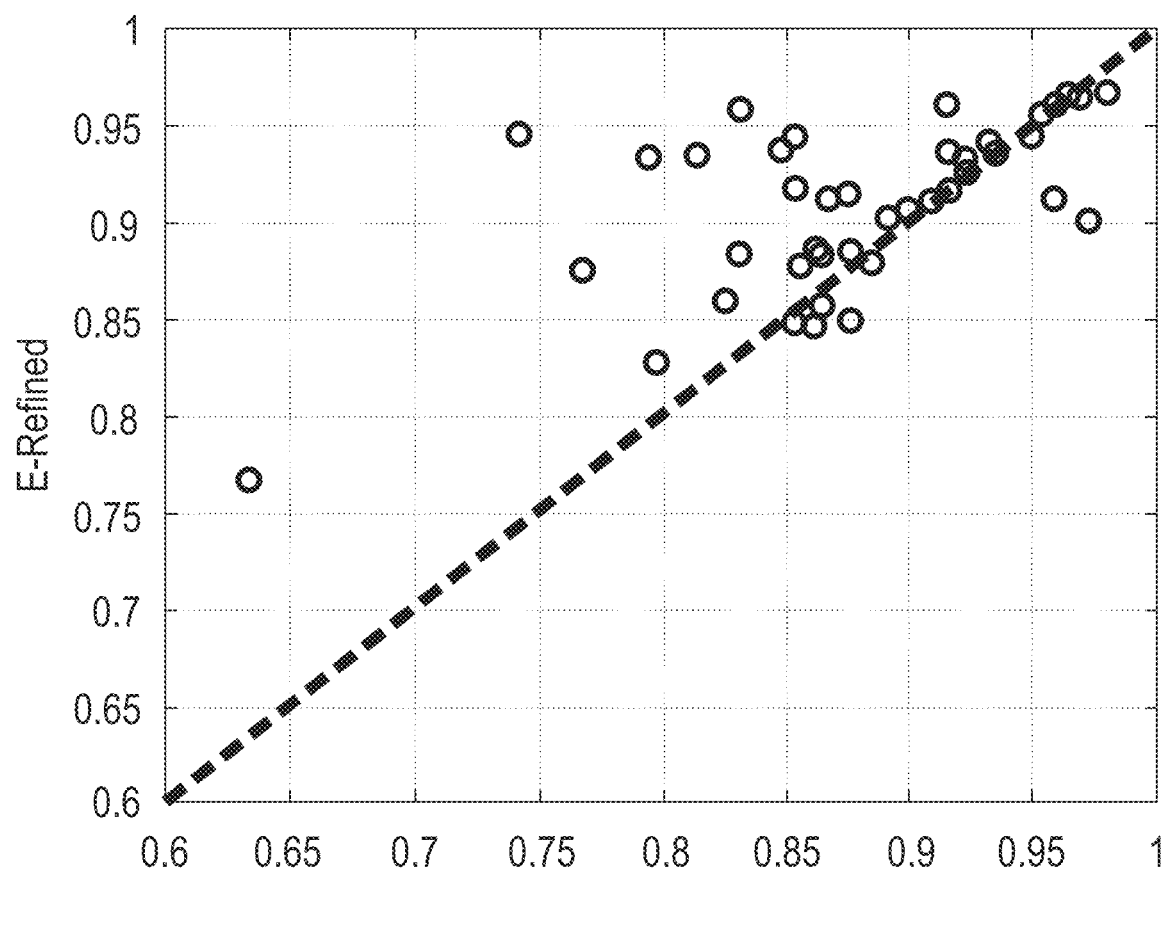

Referring to FIG. 5, a plot of performance of lung bounding box alignment in DSC is provided. The results are plotted to compare the two example-based methods against ANTs affine registration.

In Table 1, the performance of lung bounding box alignment in DSC is shown. Testing images are equally divided into the top 50% group where ANTs affine registration produced better results than images in the bottom 50% group.

TABLE 1

|  | Bottom 50% | Top 50% | All |
|---|---|---|---|
| SpatialTran | 0.841 ± 0.039 | 0.816 ± 0.041 | 0.828 ± 0.044 |
| FLIRT | 0.862 ± 0.118 | 0.870 ± 0.106 | 0.866 ± 0.111 |
| ANTs | 0.825 ± 0.058 | 0.929 ± 0.032 | 0.878 ± 0.070 |
| Example | 0.870 ± 0.042 | 0.915 ± 0.042 | 0.893 ± 0.047 |
| E-Refined | 0.885 ± 0.049 | 0.928 ± 0.029 | 0.907 ± 0.045 |

FIG. 5 and Table 1, summarize the affine warping performance in terms of aligning lung bounding boxes. Table 1 also provides detail performance information by breaking the testing images into two equal size groups based on ANTs affine registration performance. Both FLIRT and ANTs outperformed spatial transformer networks. Spatial transformer networks could be trapped to local optimal solutions during training, which may cause the less competitive results. FLIRT produced slightly worse results than ANTs affine registration. With limited training images, the example-based estimation already produced more reliable results, with clear advantages in robustness.

For the bottom 50% testing images where ANTs affine registration produced less accurate results, example-based estimation produced ~4% improvement. For the top 50% testing images where ANTs affine registration worked well, the results produced by example-based estimation are ~1% worse. Overall, example-based estimation produced more accurate affine transformations than ANTs. The improvement is statistically significant, with $p<0.05$ on the paired Students t-test. Using these results to initialize ANTs affine registration produced further improvement. The advantage is further enhanced on images where ANTs affine registration worked poorly. Furthermore, the performance gap on images where ANTs registration works well is removed. The overall improvement over ANTs affine registration is statistically significant, $p<0.001$.

Figure 6A:
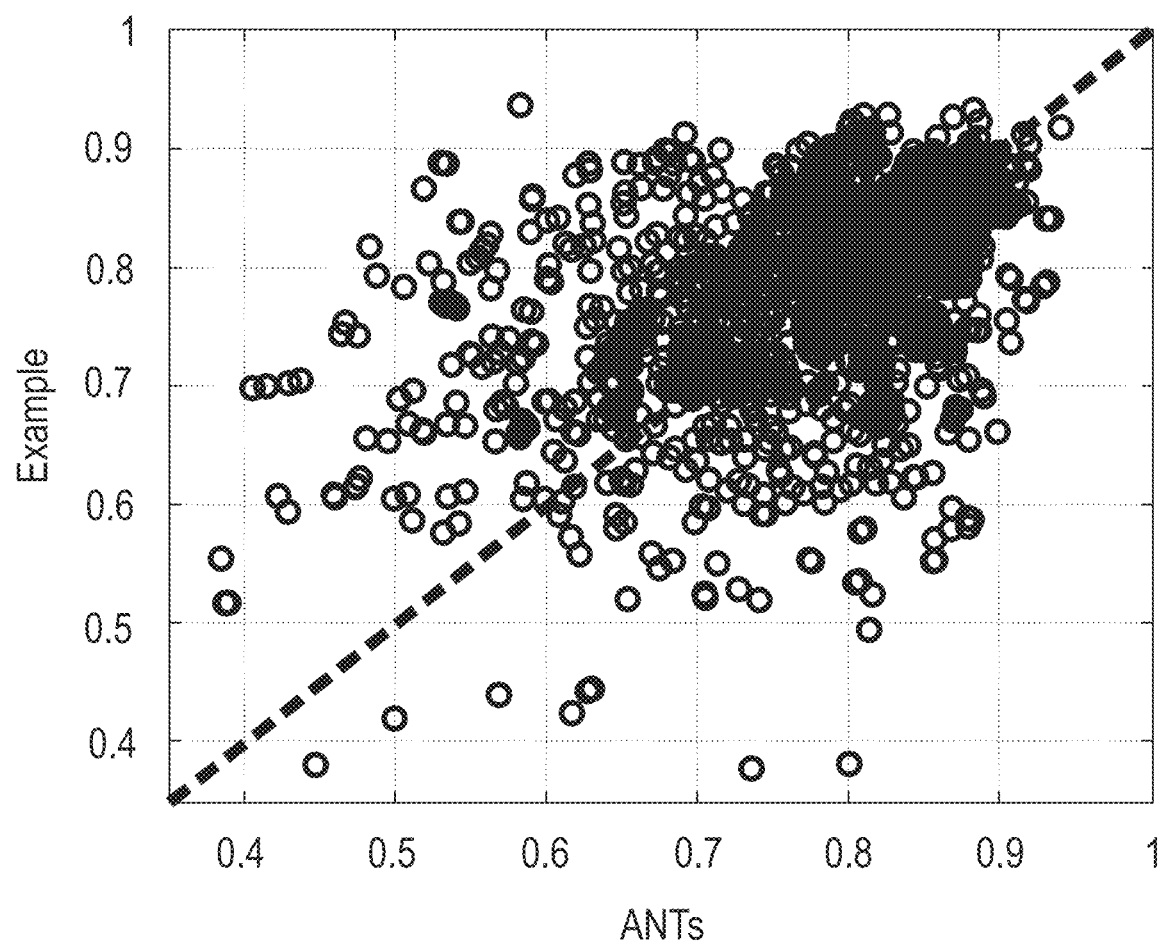
FIGS. 6A-B illustrate performance of pairwise heart segmentation alignment.
Figure 6B:
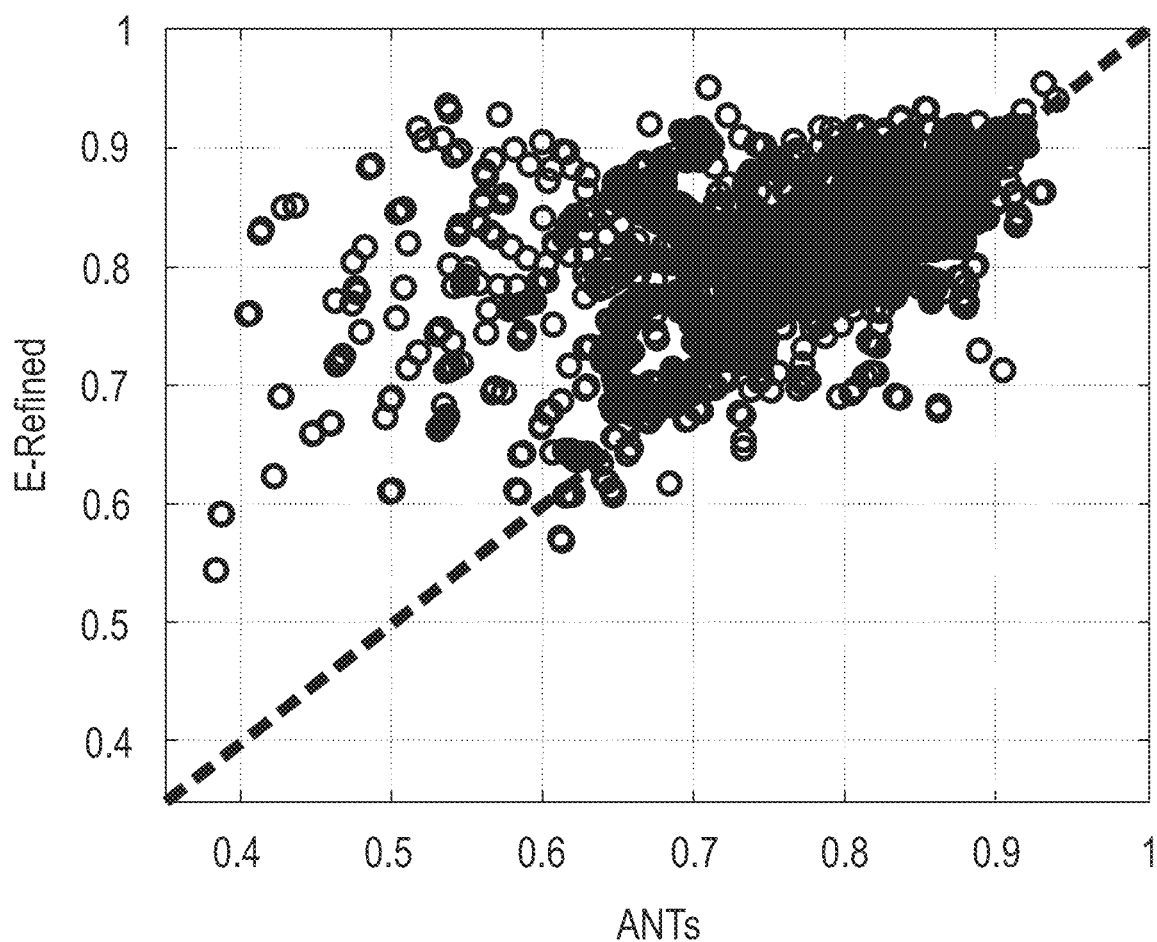

In FIG. 6, performance of pairwise heart segmentation alignment in DSC is illustrated. The results are plotted to compare the two example-based methods against ANTs affine registration. Table 2 shows the performance of pairwise heart segmentation alignment in DSC. The testing image pairs are further equally divided into the top 50% group where ANTs affine registration produced better results than image pairs in the bottom 50% group.

TABLE 2

|  | Bottom 50% | Top 50% | All |
|---|---|---|---|
| SpatialTran | 0.660 ± 0.145 | 0.719 ± 0.120 | 0.690 ± 0.136 |
| FLIRT | 0.662 ± 0.186 | 0.724 ± 0.168 | 0.693 ± 0.180 |
| ANTs | 0.674 ± 0.083 | 0.835 ± 0.037 | 0.754 ± 0.103 |
| Example | 0.739 ± 0.094 | 0.801 ± 0.081 | 0.770 ± 0.093 |
| E-Refined | 0.789 ± 0.072 | 0.843 ± 0.046 | 0.816 ± 0.066 |

FIG. 6 and Table 2 summarize the pairwise affine registration performance for heart segmentation produced using different registration methods. Example-based estimation produced more accurate results for images, where optimization-based estimation worked poorly. Applying example-based estimation as initialization to optimization-based estimation produced more prominent improvement. Overall, both example-based methods significantly outperformed ANTs affine registration, with $p<0.001$ on the paired Students t-test.

Figure 7A:
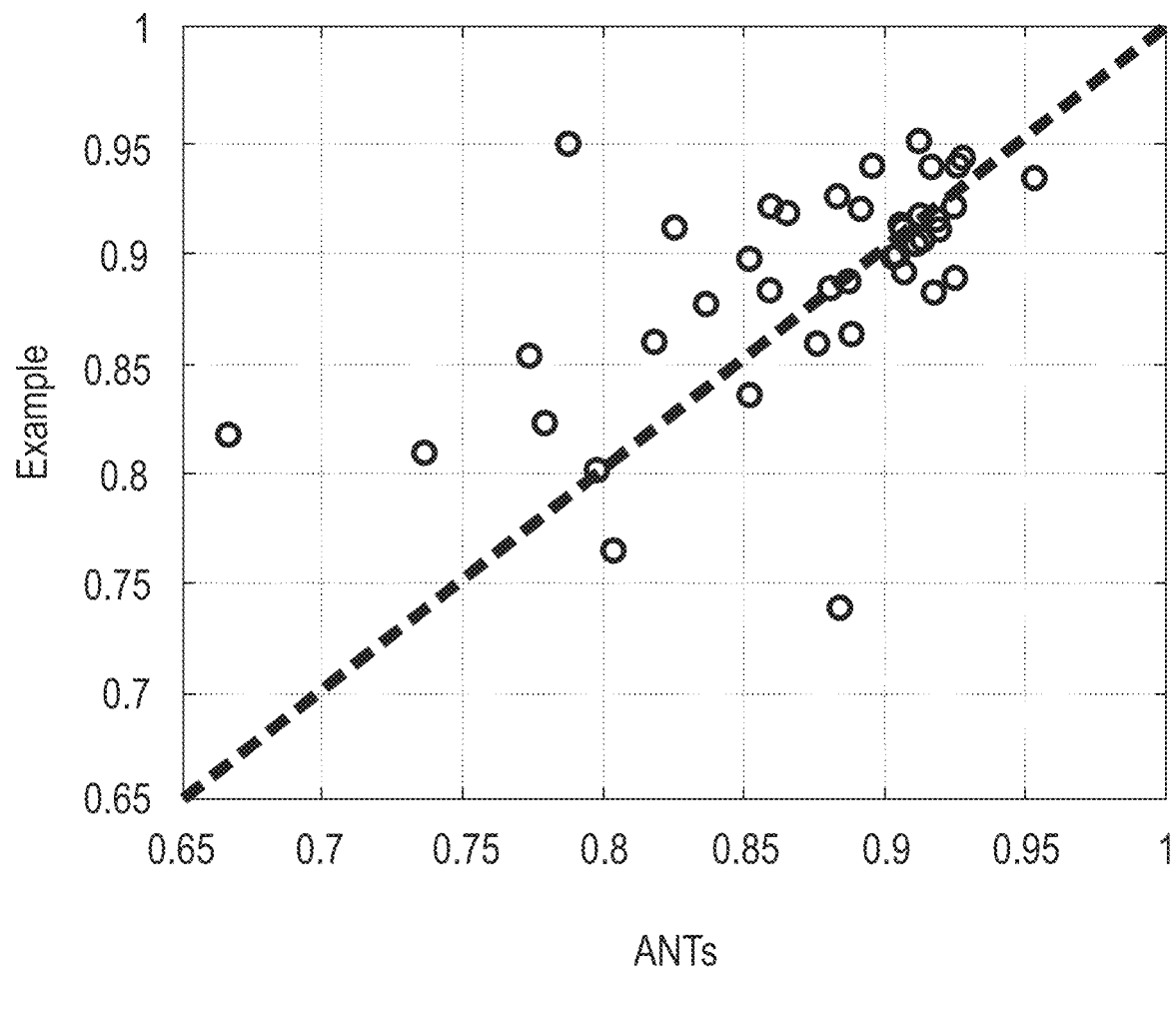
FIGS. 7A-B illustrate exemplary heart segmentation according to embodiments of the present disclosure.
Figure 7B:
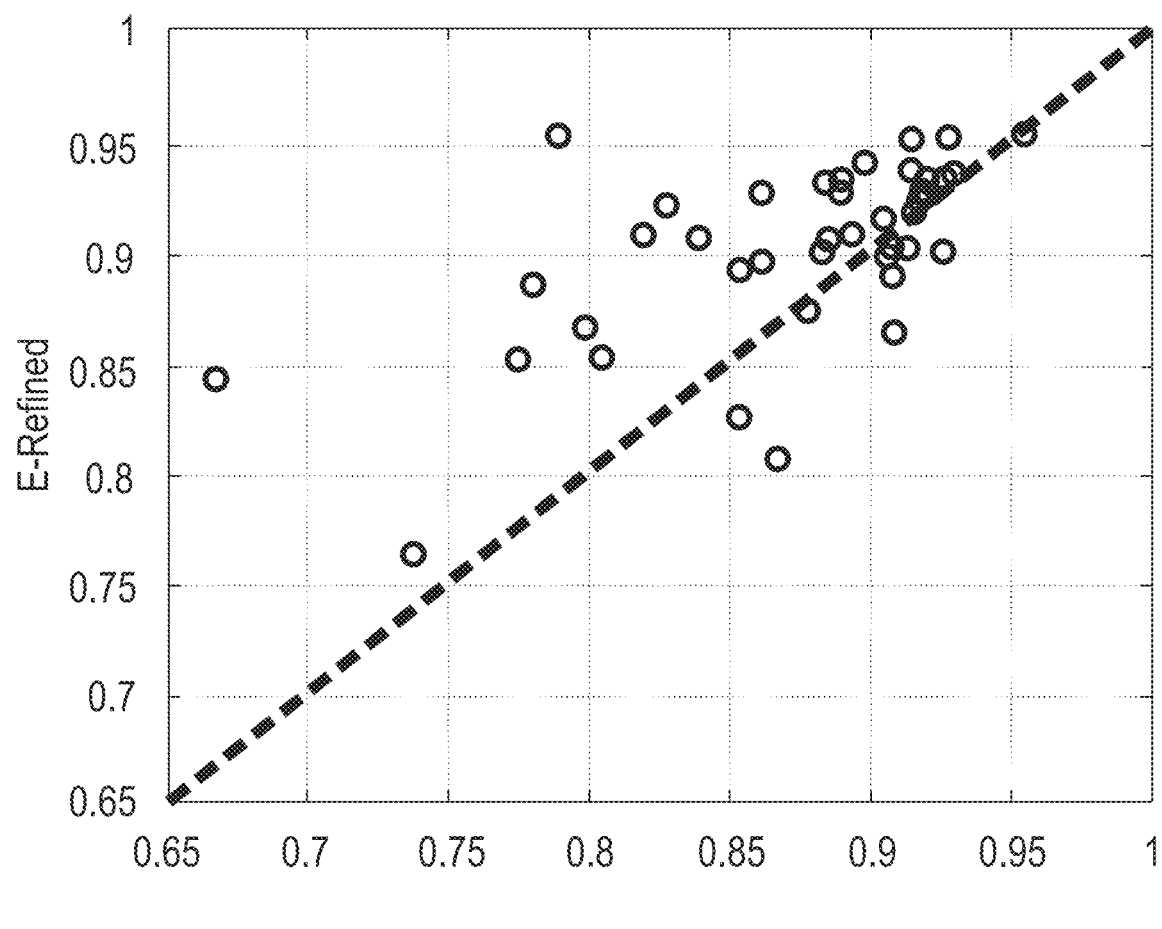

In FIG. 7, heart segmentation (DSC) from leave-one-out cross-validation using different affine registration methods is illustrated. Table 3 shows performance of heart segmentation in DSC.

TABLE 3

| SpatialTran | FLIRT | ANTs | Example | E-Refined |
|---|---|---|---|---|
| 0.813 ± 0.099 | 0.828 ± 0.165 | 0.872 ± 0.060 | 0.886 ± 0.049 | 0.901 ± 0.041 |

FIG. 7 and Table 3 summarize heart segmentation results produced by using different registration methods. Label fusion results produced by the two example-based estimation methods are 1.4% and 2.9% better than those produced using ANTs affine registration. The improvements are statistically significant, with $p<0.05$ and $p<0.001$, respectively.

Figure 8:
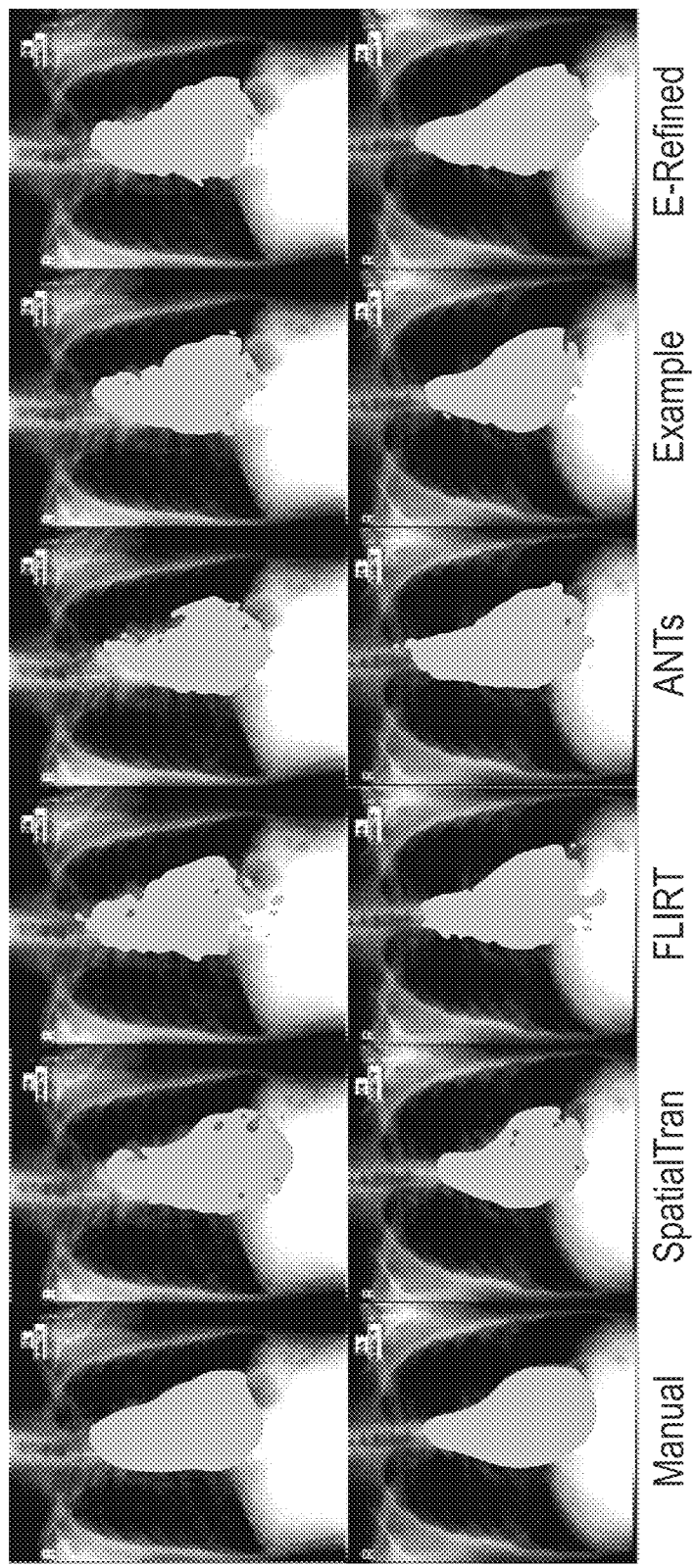
FIG. 8 illustrates exemplary heart segmentation obtained by joint label fusion according to embodiments of the present disclosure.

FIG. 8 shows example heart segmentation obtained by joint label fusion based on pairwise affine registrations produced by different methods.

Figure 9:
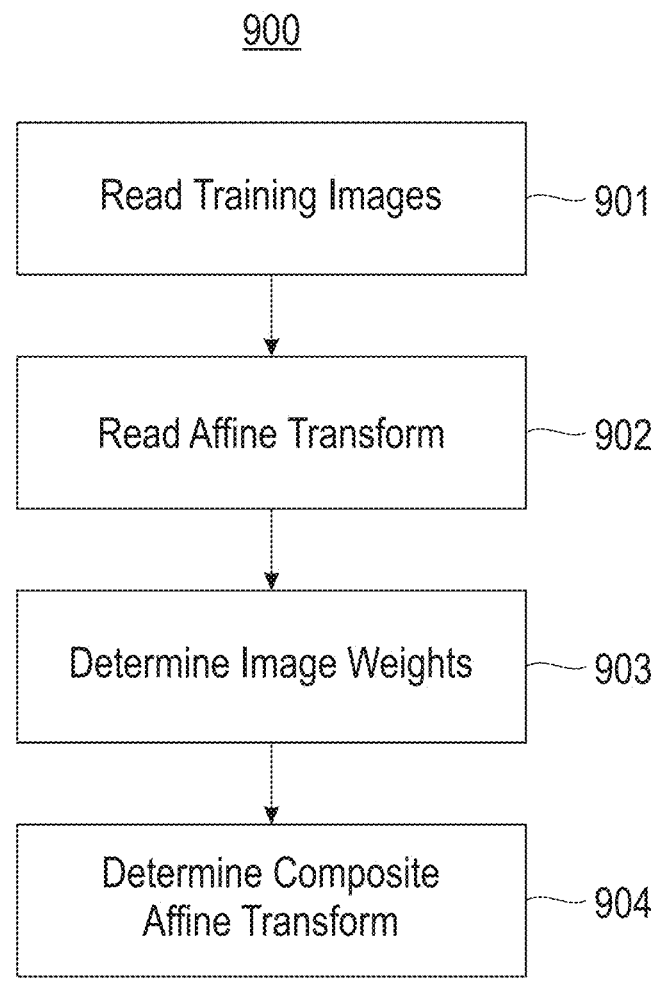
FIG. 9 illustrates a method of affine registration according to embodiments of the present disclosure

Referring to FIG. 9, a method of affine registration according to embodiments of the present disclosure is illustrated. At 901, a plurality of training images is read. At 902, a predetermined affine transform is read for each of the plurality of training images. Each affine transform maps its associated image to a template. At 903, weights are determined for each of the plurality of training images. The weights are determined to minimize a difference between the test image and a weighted linear combination of the training images. At 904, an affine transform is determined mapping the test image to the template by computing a weighted linear combination of the affine transforms using the weights.

As set out herein, affine registration aims to find an affine transform between image pairs that aligns one image to the other. A set of training images is leveraged, where an affine transform that aligns the training image to a template image is already known. An affine transform is produced that aligns a new testing image to the same template. A non-negative weight is calculated for each training image such that the difference between the testing image and the linear combination of the training images based on the weights is minimized. The affine transform for the testing image is produced through linearly combining the affine transforms of the training images using the weights. The affine transform is refined by applying the estimated affine transform as initialization to an optimization-based affine registration algorithm. These techniques are applicable to solve affine transformation for both 2D and 3D images. In various embodiments, the non-negative weights are calculated with the following steps: Calculating a covariance matrix M for training images; Solving weights; and if the weights contain negative weights, then the training images with negative weights are removed and the process repeats—Otherwise, return the weights for remaining training images and return 0 weight for removed training images.

Figure 10:
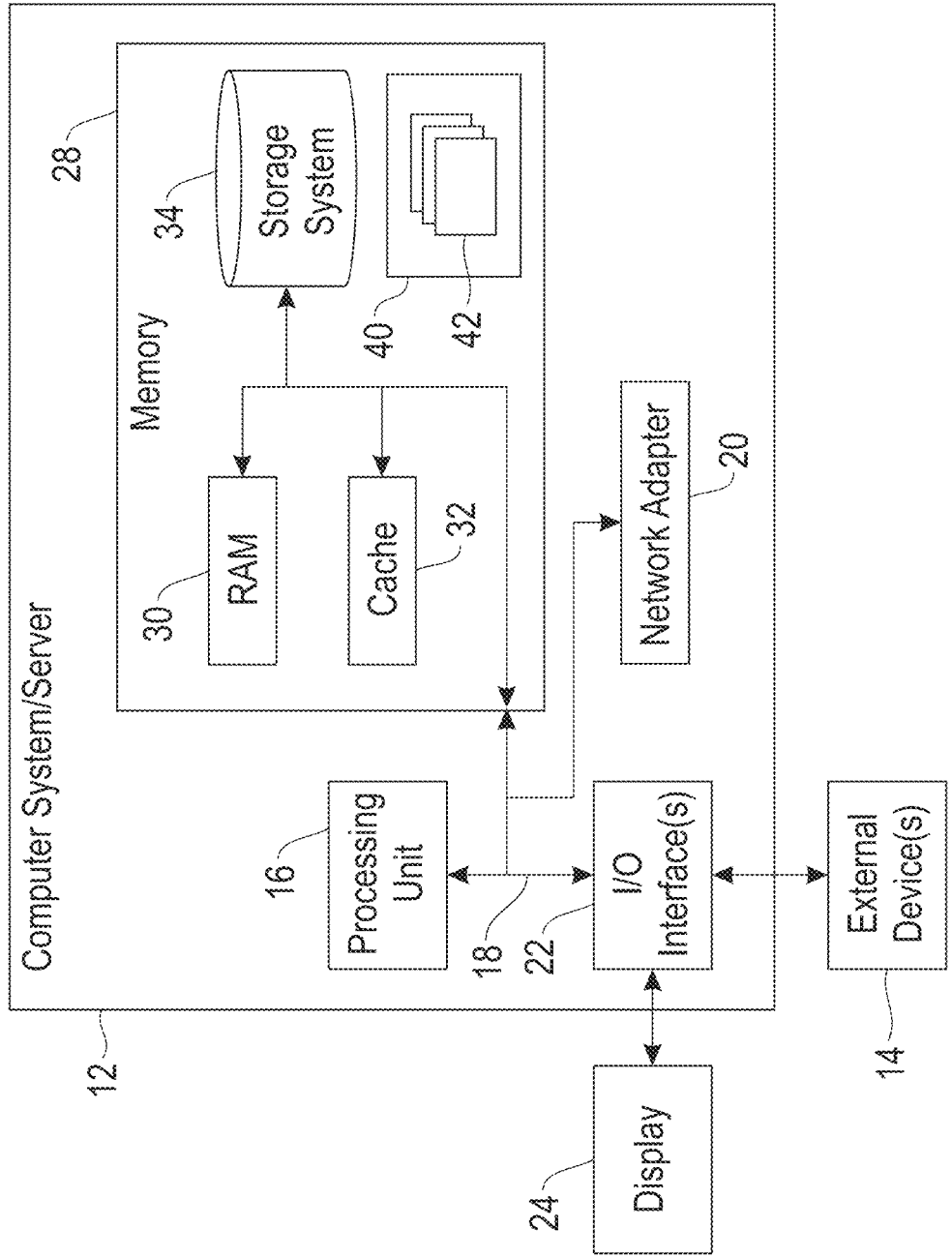
FIG. 10 depicts a computing node according to an embodiment of the present disclosure.

Referring now to FIG. 10, a schematic of an example of a computing node is shown. Computing node 10 is only one example of a suitable computing node and is not intended to suggest any limitation as to the scope of use or functionality of embodiments described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 10, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, Peripheral Component Interconnect Express (PCIe), and Advanced Microcontroller Bus Architecture (AMBA).

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present disclosure may be embodied as a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
reading a plurality of training images;
determining an affine transform for each of the plurality of training images, each affine transform mapping its associated image to a template;
determining weights for each of the plurality of training images, the weights being determined to minimize a difference between the test image and a weighted combination of the training images; and
determining an affine transform mapping the test image to the template by computing a weighted combination of the affine transforms using the weights.

2. The method of claim 1, wherein determining the weights comprises:
computing a covariance matrix for the training images.

3. The method of claim 2 further comprising:
discarding all training images having negative weights.

4. The method of claim 1, further comprising:
providing the affine transform as an initialization to a second registration algorithm.

5. The method of claim 4, wherein the second registration algorithm is an optimization-based algorithm.

6. The method of claim 5, wherein the optimization-based algorithm comprises Advanced Normalization Tools.

7. The method of claim 4, wherein the second registration algorithm is a deformable registration algorithm.

8. The method of claim 1, wherein the test image is two-dimensional.

9. The method of claim 1, wherein the test image is three-dimensional.

10. A system comprising:
a computing node comprising a computer readable storage medium having program instructions embodied therewith, the program instructions executable by a processor of the computing node to cause the processor to perform a method comprising:
reading a plurality of training images;
determining an affine transform for each of the plurality of training images, each affine transform mapping its associated image to a template;
determining weights for each of the plurality of training images, the weights being determined to minimize a difference between the test image and a weighted combination of the training images; and
determining an affine transform mapping the test image to the template by computing a weighted combination of the affine transforms using the weights.

11. The system of claim 10, wherein determining the weights comprises:
computing a covariance matrix for the training images.

12. The system of claim 11, the method further comprising:
discarding all training images having negative weights.

13. The system of claim 10, the method further comprising:
providing the affine transform as an initialization to a second registration algorithm.

14. The system of claim 13, wherein the second registration algorithm is an optimization-based algorithm.

15. The system of claim 14, wherein the optimization-based algorithm comprises Advanced Normalization Tools.

16. The system of claim 13, wherein the second registration algorithm is a deformable registration algorithm.

17. The system of claim 10, wherein the test image is two-dimensional.

18. The system of claim 10, wherein the test image is three-dimensional.

19. A computer program product for affine registration, the computer program product comprising a computer readable storage medium having program instructions embodied therewith, the program instructions executable by a processor to cause the processor to perform a method comprising:

reading a plurality of training images;

determining an affine transform for each of the plurality of training images, each affine transform mapping its associated image to a template;

determining weights for each of the plurality of training images, the weights being determined to minimize a difference between the test image and a weighted combination of the training images; and determining an affine transform mapping the test image to the template by computing a weighted combination of the affine transforms using the weights.

20. The computer program product of claim 19, the method further comprising:

providing the affine transform as an initialization to a second registration algorithm.

\* \* \* \* \*